US008037042B2

(12) United States Patent
Anderson et al.

(10) Patent No.: US 8,037,042 B2
(45) Date of Patent: Oct. 11, 2011

(54) AUTOMATED ANALYSIS OF USER SEARCH BEHAVIOR

(75) Inventors: Blake Edward Anderson, Bothell, WA (US); Robert Ching-Huei Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 622 days.

(21) Appl. No.: 11/803,019

(22) Filed: May 10, 2007

(65) Prior Publication Data
US 2008/0281809 A1 Nov. 13, 2008

(51) Int. Cl.
G06F 7/00 (2006.01)
(52) U.S. Cl. .............. 707/705; 707/999.003; 715/12; 715/14.44; 715/14.49
(58) Field of Classification Search .................. None
See application file for complete search history.

(56) References Cited

U.S. PATENT DOCUMENTS

| 5,201,047 | A |   | 4/1993  | Maki |  |
|---|---|---|---|---|---|
| 5,241,671 | A |   | 8/1993  | Reed | 395/600 |
| 5,652,880 | A |   | 7/1997  | Seagraves | 395/614 |
| 5,724,571 | A |   | 3/1998  | Woods |  |
| 5,855,015 | A | * | 12/1998 | Shoham | 707/5 |
| 5,864,845 | A |   | 1/1999  | Voorhees | 707/5 |
| 6,006,225 | A |   | 12/1999 | Bowman |  |
| 6,397,212 | B1 |  | 5/2002  | Biffar | 707/5 |
| 6,678,679 | B1 | * | 1/2004 | Bradford | 707/5 |
| 6,732,088 | B1 |  | 5/2004  | Glance | 707/3 |
| 6,832,218 | B1 |  | 12/2004 | Emens | 707/3 |
| 6,839,680 | B1 |  | 1/2005  | Liu | 705/10 |
| 7,062,487 | B1 |  | 6/2006  | Nagaishi |  |
| 7,069,254 | B2 |  | 6/2006  | Foulger | 706/14 |
| 7,082,428 | B1 |  | 7/2006  | Denny | 707/5 |
| 7,092,936 | B1 |  | 8/2006  | Alonso | 707/3 |
| 7,117,208 | B2 |  | 10/2006 | Tamayo | 707/6 |
| 7,130,849 | B2 | * | 10/2006 | Yayoi et al. | 707/5 |
| 7,165,105 | B2 |  | 1/2007  | Reiner | 709/224 |

(Continued)

FOREIGN PATENT DOCUMENTS
EP 1 708 105 A1 10/2006

OTHER PUBLICATIONS

Agichtein et al., "Improving Web Search Ranking by Inincorporating User Behavior Information," SIGIR '06, Seattle, WA, Aug. 6-11, 2006, pp. 19-26.

(Continued)

*Primary Examiner* — Wilson Lee
*Assistant Examiner* — Jessica N Le
(74) *Attorney, Agent, or Firm* — Merchant & Gould (57) ABSTRACT

Automated analysis of user search behavior is provided. Data on user searches is maintained in a user search database. Relevance factors are determined for each search result included in a given search session where the relevance factors provide an indication of user satisfaction with particular search results included in the session. The relevance factors for each search result are analyzed by a relevance classification module for classifying each search result in terms of its relevance to an associated search query. The result of the relevance classification may assign a relevance classification and associated confidence level to each analyzed search result as to whether the search result is acceptable, unacceptable or partially acceptable relative to the search query that resulted in the search result. Relevance classifications for each analyzed search result may be stored for future use, for example, for diagnostic analysis of the operation of a given search mechanism.

9 Claims, 3 Drawing Sheets

U.S. PATENT DOCUMENTS

| | | | |
|---|---|---|---|
| 7,283,997 B1 * | 10/2007 | Howard et al. ............... | 707/5 |
| 7,424,469 B2 | 9/2008 | Ratnaparkhi | |
| 2002/0112048 A1 | 8/2002 | Gruyer ............... | 709/224 |
| 2003/0014399 A1 * | 1/2003 | Hansen et al. ............... | 707/3 |
| 2003/0018626 A1 | 1/2003 | Kay | |
| 2003/0144994 A1 * | 7/2003 | Wen et al. ............... | 707/3 |
| 2004/0260688 A1 | 12/2004 | Gross | |
| 2005/0071328 A1 * | 3/2005 | Lawrence ............... | 707/3 |
| 2005/0125374 A1 | 6/2005 | Curtis | |
| 2005/0125382 A1 * | 6/2005 | Karnawat et al. ............... | 707/3 |
| 2005/0125390 A1 | 6/2005 | Hurst-Hiller ............... | 707/3 |
| 2005/0125391 A1 | 6/2005 | Curtis | |
| 2005/0131866 A1 * | 6/2005 | Badros et al. ............... | 707/3 |
| 2005/0149504 A1 * | 7/2005 | Ratnaparkhi ............... | 707/3 |
| 2005/0210024 A1 * | 9/2005 | Hurst-Hiller et al. ............... | 707/5 |
| 2005/0222987 A1 | 10/2005 | Vadon | |
| 2005/0228788 A1 | 10/2005 | Dahn | |
| 2005/0234972 A1 | 10/2005 | Zeng | |
| 2005/0289140 A1 | 12/2005 | Ford | |
| 2006/0026147 A1 | 2/2006 | Cone | |
| 2006/0041548 A1 | 2/2006 | Parsons ............... | 707/5 |
| 2006/0064411 A1 * | 3/2006 | Gross et al. ............... | 707/3 |
| 2006/0085401 A1 | 4/2006 | Anderson | |
| 2006/0224579 A1 | 10/2006 | Zheng | |
| 2006/0224583 A1 | 10/2006 | Fikes ............... | 707/6 |
| 2006/0224587 A1 | 10/2006 | Zamir | |
| 2006/0224608 A1 | 10/2006 | Zamir | |
| 2006/0224938 A1 | 10/2006 | Fikes | |
| 2006/0230040 A1 | 10/2006 | Curtis | |
| 2006/0259861 A1 | 11/2006 | Watson ............... | 715/705 |
| 2006/0259867 A1 | 11/2006 | Watson ............... | 715/760 |
| 2006/0294095 A1 | 12/2006 | Berk ............... | 707/6 |
| 2007/0005646 A1 | 1/2007 | Dumais ............... | 707/104.1 |
| 2008/0140607 A1 | 6/2008 | Chi | |
| 2008/0281808 A1 | 11/2008 | Anderson et al. ............... | 707/5 |

OTHER PUBLICATIONS

Glover, et al., "Improving Category Specific Webe Search by Learing Query Modifications," SAINT 2001, San Diego, CA., Jan. 8-12, 2001, pp. 23-31.

US Non-Final Office Action mailed Sep. 16, 2009 for US Appl. No. 11/803,018.

Zamir, et al., "Grouper: A Dynamic Clusering Interface to Web Search Results," Proc. of the 18th International Conf. on the World Wide Web, Toronto, Canada, © 1999, pp. 1-15.

Zhang et al., "Improving Web Search Results using AffinityGraph," SIGIR '05, Salvador, Brazil, Aug. 15-19, 2005, pp. 504-511.

Bucklin, Randolph E., et. al. "A Model of Web Site Browsing Behavior Estimated on Clickstream Data," Aug. 2003, University of California—Los Angeles and University of Southern California, pp. 249-267, http://www.anderson.ucla.edu/faculty/randy.bucklin/papers/bucklinandsismeiro2003.pdf.

Liang, Ting-Peng, et. al., "Discovering User Interests from Web Browsing Behavior: An Application to Internet News Services," 2002, National Sun Yat-sen University, pp. 1-10, http://www.hicss.hawaii.edu/HICSS_35/HICSSpapers/PDFdocuments/INMIW07.pdf.

Claypool, Mark, et. al., "Inferring User Interest," Aug. 31, 2001, Worcester Polytechnic Institute, pp. 1-17, http://www.cs.wpi.edu/~claypool/papers/iui/iui.ps.gz.

Manavoglu, Eren, et. al., "Probabilistic User Behavior Models," 2003, Pennsylvania State University and Yahoo Inc., pp. 1-8, http://clgiles.ist.psu.edu/papers/ICDM-2003-probabilistic-user.pdf.

Smyth, Barry, et. al., "A Live-User Evaluation of Collaborative Web Search," Jul. 22, 2005, University College Dublin, Ireland, pp. 1-6, http://ijcai.org/papers/0680.pdf.

Mobasher, Bamshad, et. al., "Automatic Personalization Based on Web Usage Mining," Oct. 10, 2003, DePaul University, Chicago, IL and University of Minnesota, Minneapolis, MN, pp. 1-24, http://cybermetrics.cindoc/csic/es/cybermetrics/pdf/251.pdf.

Glance, Natalie S., "Community Search Assistant," Jan. 2001, Xerox Research Centre Europe, pp. 91-96, http://www.iuiconf.org/01pdf/2001-001-0015.pdf.

Anyanwu et a., SemRank: Ranking Complex Relationship Search Results on the Semantic Web, Copyright © 2005, IW3C2, 11 pages.

Chekuri et al., Web Search Using Automatic Classification, 6th World Wide Web Conference, Copyright © 1997, 11 pages.

Leouski et al., An Evaluation of Techniques for Clustering Search Results, Space & Naval Warfare Systems Center Report, Sponsors: NSF/LOC/DOC (EEC-9209623) and NRaD (Contract No. N66001-94-D-6054), Copyright © 2005, pp. i and 1-19.

Chen et al., "WebSail: From On-line Learning to Web Search," Web Information Systems Engineering, 2000, Proceedings of the First International Conference on Hong Kong, China, Jun. 19-21, 2000, 9 pages.

* cited by examiner

AUTOMATED ANALYSIS OF USER SEARCH BEHAVIOR

RELATED APPLICATIONS

This application is related to U.S. patent application Ser. No. 11/803,018, filed May 10, 2007, now US. Pat. No. 7,752, 201 and titled, "RECOMMENDATION OF RELATED ELECTRONIC ASSETS BASED ON USER SEARCH BEHAVIOR".

BACKGROUND

With the advent of search functions across distributed computing networks, such as the Internet, a variety of searchable assets, for example, web pages, websites, and associated content, are available to searching users. Providers of such content and providers of search mechanisms, such as Internet browsing applications, often desire user feedback on how acceptable or useful a given web asset is in relation to an associated search query. For example, a developer of a web browsing application may desire user feedback on the acceptability and quality of search results provided in response to associated search queries so that the developer may improve the search functionality of the web browsing application. Prior systems have relied on explicit feedback from searching users, but unfortunately, a very small number of users typically respond to requests for explicit feedback, and thus, the small quantity of feedback responses may cause the reliability of such feedback to be suspect. Prior systems have also relied on click-through information, including information on whether a user actually selects a given search result and/or selects additional items in a given search result, but whether a user selects a given search result and any additional items in a given search result may not be indicative of satisfaction with the selected search result.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve and above and other problems by providing automated analysis of user search behavior. According to an embodiment, data on user searches is maintained in a user search database, including such data as search queries (search strings) used to conduct a search, user behavior on a selected search result, for example, printing a given search result, etc., and any explicit feedback provided by a searching user on a selected search result, for example, a content rating.

Search activity for one or more users is organized into search sessions where a typical session represents searches directed to a single user search topic. Statistics or relevance factors are determined for each search result included in a given session where the statistics or relevance factors provide an indication of user satisfaction with particular search results included in the session. Examples of relevant statistics or factors include the time spent viewing a particular search result, how a user exited from a selected search result, a sequence in which a user views particular search results, etc.

The relevance factors or statistics determined for each search result are analyzed via a relevance classification module for classifying each search result in terms of its relevance to the search initiated by the searching user. The result of the relevance classification may assign a relevance classification and associated confidence level to each analyzed search result. For example, a given search result may be classified as acceptable, (correct response to a search query), unacceptable (incorrect response to a search query), or partially acceptable (the search result did not entirely answer a search query, but provided partial information). Relevance classifications for each analyzed search result may then be stored for future use, for example, for diagnostic analysis of the operation of a given search mechanism.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to analysis of user search behavior. The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Figure 1:
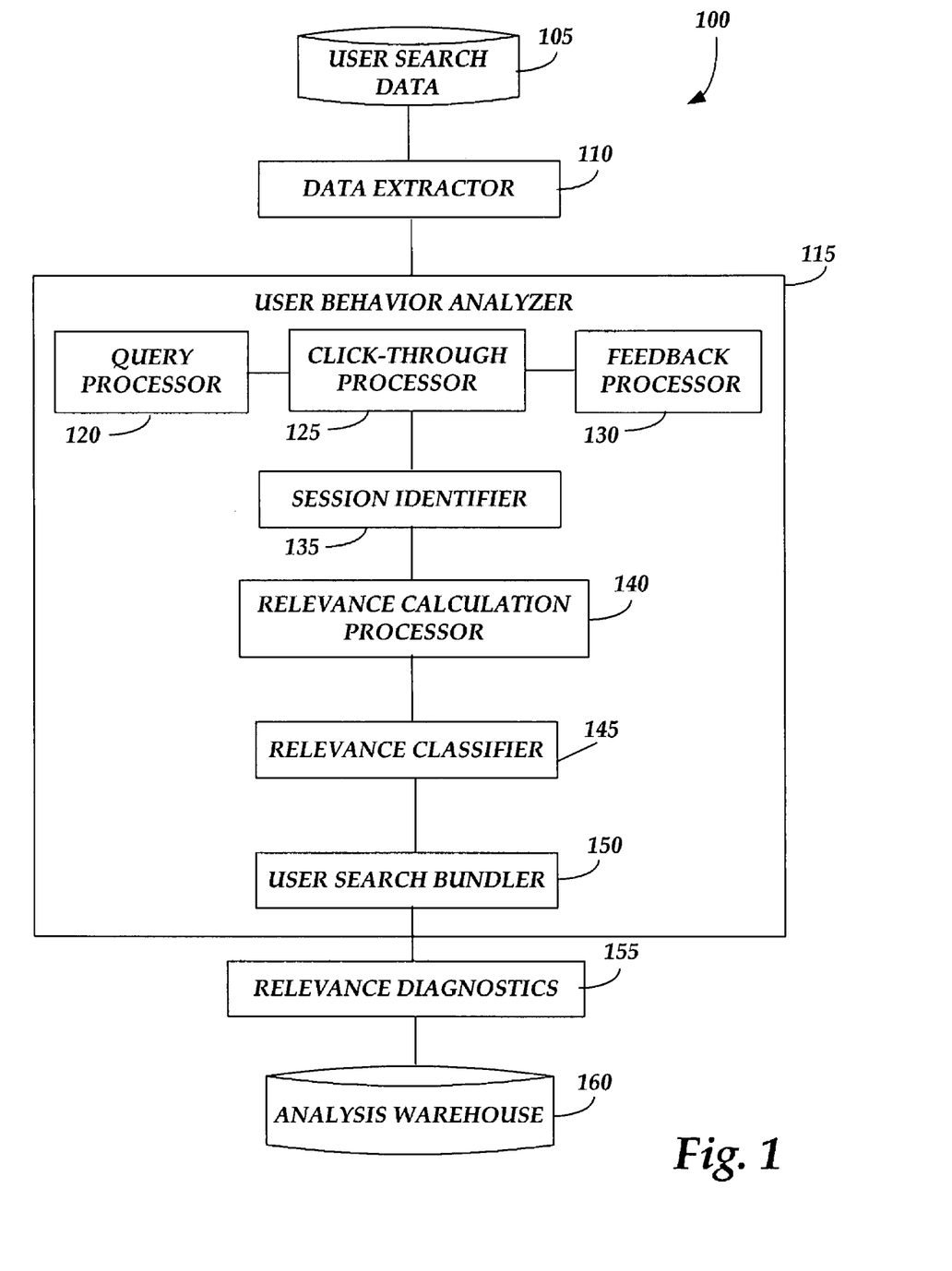
FIG. 1 is a simplified block diagram illustrating an architecture of a system for automated analysis of user search behavior.

FIG. 1 is a simplified block diagram illustrating an architecture of a system for automated analysis of user search behavior. The user search behavior analysis system 100, illustrated in FIG. 1, is operative to analyze search behavior for one or more users and for determining the relevance of search results to associated search queries. According to one embodiment, the system 100 provides a framework to estimate user satisfaction with Internet-based search results based on user behavior (implicit feedback) in combination with explicit user feedback. Predicted user satisfaction in combination with explicit user feedback may provide metrics for measuring a user's satisfaction with search results and for giving a developer of a searchable content item or developer of a search mechanism important feedback on how to improve the mapping between search query terms and resulting search content. According to an embodiment, the components of the system 100, described below, may operate as a single application comprised of each of the described components, or components of the system may be located in disparate locations and may communicate with each other via a distributed computing network, such as the Internet or an intranet.

Referring still to FIG. 1, the system 100 includes a user search database in which data on user search behavior is stored. According to an embodiment, the database 105 may be updated on a continuous or periodic basis during run time of a given search mechanism, for example, an Internet browsing application. Data that may be logged in the database 105 may include any data associated with a user and the user's behavior during the search of one or more web-based assets (for example, web pages, websites, and associated content) and may include data associated with many users performing searches. For example, data stored in the database 105 may include an identification of a searching user, executed search queries, for example, search strings, entered by a searching user, click-through behavior associated with user actions on a given web asset, for example, whether the user opens a given asset, whether the user prints a given asset, whether the user selects links to other web assets embedded in a given asset, whether the user electronically mails or otherwise sends a link to a given asset to another user, whether the user adds a selected asset to a favorites list, whether the user applies any software functionality, for example, formatting to a selected web asset, etc.

In addition, any explicit feedback a user provides has on a given asset may be stored in the database 105. For example, a user may be requested to complete a survey for rating an asset, for example, on a scale from one to five, good, medium, bad, etc. Such explicit feedback systems may allow a user to rate the relevance of a selected web asset to the user's search query, or such feedback systems may simply allow the user to rate the quality of the web asset. In addition, a user may be provided an opportunity to provide textual comments on the relevance of a given web asset to the user's search or on the quality or usefulness of a given web asset.

According to an embodiment, data logged in the database 105 for a given searching user may be stored and subsequently analyzed (as described below) in "packets" of data. A packet of data may be comprised of user searching and search result use behaviors logged during the user's searching operations over a set amount of time. The analysis described herein on user search behavior may be performed on the user behavior of multiple users, but according to one embodiment, user search behavior analysis is performed on a user by user basis based on packets of data associated with given users.

Referring still to FIG. 1, the data extractor module 110 is operative to extract user search data from the database 105 and for preparing the data for subsequent user search behavior analysis. The data extractor module 110 may perform data cleaning and spam detection on extracted data. In addition, the data extractor module 110 may transform batched data contained in the database 105 into a format useful for subsequent processing. For example, data contained in the database 105 may be transformed into a format such as the Extensible Markup Language (XML) format for use in a subsequent data analysis application.

The user behavior analyzer 115 is operative to process extracted user search behavior data so that a relevance classification may be applied to each search result obtained in response to a given search query. The user behavior analyzer 115 may invoke a query processor module 120 for reading the data obtained from the database 105 related to user searches. For example, the query processor may read data including specific search results stored in the database 105 that are responsive to associated search queries. The user behavior analyzer 115 may invoke a click-through processor module 125 that is operative to read data extracted from the database 105 associated with user behavior on selected web assets, for example, whether the user opens a given asset, whether the user prints a given asset, whether the user selects links to other web assets embedded in a given asset, whether the user electronically mails or otherwise sends a link to a given asset to another user, whether the user adds a selected asset to a favorites list, whether the user applies any software functionality, for example, formatting to a selected web asset, etc. The user behavior analyzer 115 may invoke a feedback processor module 130 for reading data extracted from the database 105 related to explicit user feedback on a given web asset.

The session identifier module 135 may be invoked by the user behavior analyzer 115 for grouping user search behavior into sessions. According to one embodiment, one method of grouping user search behavior into sessions is based on a time gap between consecutive user searches and based on the common web assets of the search results. As should be appreciated, other methods of grouping user search behavior into sessions may also be employed. According to one embodiment, every user search is initially assigned a unique session identification. Searching behaviors (individual searches and actions on searched assets) may be grouped in sessions based on the time gap between two consecutive searching behaviors and based on the common assets in a result displayed list containing search results displayed in response to the search behaviors. The threshold for the time gap between consecutive searching behaviors may be increased proportionally based on the number of common assets between the two consecutive search behaviors.

The relevance calculation processor module 140 may be invoked by the user behavior analyzer 115 for calculating a set of relevance factors for each search result that a user clicks through and for storing relevance factors in the user behavior analyzer 115. If the user does not give explicit feedback for a given search result, a relevance classifier module 145 (described below) may use the relevance factors associated with the search result to determine if the user was satisfied with the search result or not. A description of a number of relevance factors is set out in Table 1 below. As should be appreciated the relevance factors listed in Table 1 are for purposes of example only and are not exhaustive of all relevance factors that may be used to determine user satisfaction with a given search result as described herein.

TABLE 1

| Name | Description |
| --- | --- |
| LastViewStartedDateTime | Date and time that the last ViewStarted event happened for a specific result. |
| LastViewEndedDateTime | Date and time that the last ViewEnded event happened for a specific result. |
| RatingPresent | True if there is a rating present, false if not. |
| ResultViewCountForSearch | The number of results viewed for the UserSearch associated with a specific result. |
| ResultClickCount | The number of selected events associated with a specific result. |
| ExitType | The manner in which the user exited viewing a specific result. This takes advantage of the session identification processor module. There are three possible values: IssueAnotherQuery - User issued another query after viewing result. ViewAnotherResult - User viewed another result after viewing current result. Finish - There were no more behaviors within this session for the user after viewing this result. |

TABLE 1-continued

| Name | Description |
| --- | --- |
| ViewSequence | The order in which the user viewed a specific Result within a UserSearch. |
| EntryPoint | The EntryPoint for the UserSearch associated with a specific result. |
| QueryCultureName | Name of the QueryCulture for the UserSearch associated with a specific result. |
| LastViewOfSearch | True if a specific Result is the last one viewed in the UserSearch, otherwise false. |
| FirstViewStartedDateTime | Date and time that the first ViewStarted event happened for a specific result. |
| DifferentCulture | True if a specific result has a different QueryCulture record associated with it than its parent UserSearch, otherwise false. |
| ResultsAfter | The number of results that were viewed after a specific result within the UserSearch. |
| SecondsFromSearchStarted | The number of seconds that elapsed between issuing the query and viewing the specific result. |
| QueryLanguageName | Name of the QueryCulture for the UserSearch associated with the result. |
| DisplaySequence | The order in which a specific result was displayed. |
| ExplicitJudgment | Explicit Accept/Reject/Explore judgment. |
| RawDwellTime | The difference between the LastViewStartedDateTime and FirstFeedbackResponseDateTime, or The difference between the LastViewStartedDateTime and LastViewEndedDateTime. |
| DwellTime | Log(RawDwellTime) RawDwellTime is transformed to logarithm space because the long tail in RawDwell time distribution distorts the calculation of average RawDwellTime. |
| NormalizedAvgAssetDwellTime NormalizedAvgSatDwellTime NormalizedAvgDSatDwellTime | See the Normalized Asset Dwell Time section below for details. |

According to one embodiment, the NormalizedAvgAssetDwellTime, NormalizedAvgSatDwellTime, and NormalizedAvgDSatDwellTime relevance factors (listed in Table 1 above) may be computed as follows:

1. NormalizedAvgAssetDwellTime=DwellTime−MeanDwellTimeAsset
NormalizedAvgSatDwellTime=DwellTime−MeanDwellTimeSATAsset
NormalizedAvgDSatDwellTime=DwellTime−MeanDwellTimeDSATAsset
2. The LogDwellTimeUpperBound (LogUTUB) is an upper bound to be used to remove outliers when computing MeanDwellTime, MeanDwellTimeSATAsset, and MeanDwellTimeDSATAsset for each asset. LogDwellTimeUpperBound=Log(Avg(RawDwellTime)+2*STDEV(RawDwellTime))
3. MeanDwellTimeAsset is the average DwellTime for Results which are associated with an asset. Outliers are removed from the average calculation using the following filter DwellTime<=LogDwellTimeUpperBound.
4. MeanDwellTimeSATAsset is the average DwellTime for Results which are associated with an asset and have explicit satisfaction feedbacks. Outliers are removed from the average calculation using the following filter DwellTime<=LogDwellTimeUpperBound. The average is calculated when there are at least 3 explicit satisfaction feedbacks associated with an asset.
5. MeanDwellTimeDSATAsset is the average DwellTime for Results which are associated with an asset and have explicit dissatisfaction feedbacks. Outliers are removed from the average calculation using the following filter DwellTime<=LogDwellTimeUpperBound. The average is calculated when there are at least 3 explicit dissatisfaction feedbacks associated with an asset.

According to an embodiment, all relevance factors listed in Table 1 above are computed except NormalizedAvgAssetDwellTime, NormalizedAvgSatDwellTime, and NormalizedAvgDSatDwellTime. The computed relevance factors are stored by the user behavior analyzer which then computes the NormalizedAvgAssetDwellTime, NormalizedAvgSatDwellTime, and NormalizedAvgDSatDwellTime as described above.

A relevance classifier module 145 is operative to receive calculated relevance factors from the user behavior analyzer 115 for classifying each clicked-through search result in terms of its relevance to an associated search query. According to an embodiment, the relevance classifier module produces one of three "judgments" about the relevance of a given search result to an associated search query along with a confidence level (from 0 to 0.99) for each associated judgment. According to an embodiment, a confidence level of 1.0 means that the user provided explicit feedback as to the relevance and/or quality of a given search result. Confidence levels for relevance judgments may be computed based on how closely a set of relevance factors for a search result having no explicit feedback approximates the relevance factors for a search result having explicit feedback. In addition, the confidence level may be based on the number and values (for example, dwell time) of each of the available factors. That is, the more "acceptable" relevance factors that are applicable and the better the values (for example, longer dwell time), the higher may be the confidence level.

The "judgments" that may be produced by the relevance classifier module 145 include: (1) "Accept" meaning that the user accepted this search result as the correct response to the associated search query; (2) "Reject" meaning that the user rejected this search result as the correct response to the associated search query; and (3) "Explore" meaning that this search result did not entirely answer the associated search query, but the search result provided partial information to the associated search query.

The input to the relevance classifier module includes the relevance factors described above provided for a given search result. The relevance factors of those search results having explicit feedback may be used to teach or train the relevance classifier module as to how to classify search results having no explicit feedback. For example, if for a given search result was explicitly classified by a user as "Accepted" via a rating system to which the user responded, then the user behaviors exhibited by the user for that search result may be deemed to be associated with an acceptable search result. For example, if a user selected for viewing a given search result, dwelled on the result for a given time period, printed content from the result, followed by providing explicit feedback that the search result was acceptable, then the relevance classifier module may classify other search results as acceptable (judgment of "Accept") when similar user behavior is exhibited, but for which no explicit feedback is provided.

Similarly, user behavior (in terms of relevance factors) associated with a search result explicitly classified as "unacceptable" may be used to teach the relevance classifier module how to classify subsequent search results as unacceptable where no explicit feedback is available. In effect, user behavior profiles (combinations and values of relevance factors) may be created by the relevance classifier module for acceptable, unacceptable and partially acceptable search results based on different combinations and values of relevance factors associated with search results having explicit feedback.

According to an embodiment, the relevance classifier module 145 may be in the form of a SQL 2005 Decision Tree Data Mining Model that is trained using the relevance factors associated with search results having explicit feedback from a prescribed time period, for example, 90 days of historical user search data. The relevance classifier module 145 may send a DMX query to the data mining module in the SQL 2005 analysis server to receive the above described relevance classification. The data source of the DMX query includes the relevance factors received from the user behavior analyzer 115. The outputs of the DMX query are the classifications applied to the associated search results, described above. An example DMX query that may be sent to the data mining module is shown below in Table 2.

may be performed according to another sequence. For example, the user search bundler 150 may be placed before the session identifier 135, and the results of the user search bundler 150 may be used to assist in the process of grouping search behavior into sessions, as described above.

After the relevance of various search results has been classified by the relevance classifier module 145, the classifications may be utilized for a number of purposes, as described below. For example, the relevance diagnostics module 155 is operative to calculate diagnostic information based on a single user's behavior data. For example, if all search results obtained from a given search query result in a classification of "Reject," the relevance diagnostics module 155 may be operative to determine that a confidence level associated with a given search mechanism (for example, a given web browsing application), is low when obtaining search results for

TABLE 2

```
SELECT
    t.[ResultID],
    (t.[ExplicitJudgment]) as [Actual],
    ([RC].[ExplicitJudgment]) as [Predicted],
    PredictHistogram([RC].[ExplicitJudgment])
From
    [RC]
PREDICTION JOIN
    OPENQUERY([AnalysisStager],
        'SELECT
            [ResultID],
            [ExplicitJudgment],
            [DwellTime],
            [NormalizedAvgAssetDwellTime],
            [RatingPresent],
            [NormalizedAvgSatDwellTime],
            [NormalizedAvgDSatDwellTime],
            [ResultViewCountForSearch],
            [ResultClickCount],
            [ExitType],
            [ViewSequence],
            [QueryCultureName],
            [LastViewOfSearch],
            [DifferentCulture],
            [ResultsAfter],
            [SecondsFromSearchStarted],
            [QueryLanguageName],
            [RawDwellTime],
            [DisplaySequence]
        FROM
            [RelevanceFactor] WHERE ExplicitJudgment IS NULL AND BatchID=1
        ') AS t
    ON
        [RC].[DwellTime] = t.[DwellTime] AND
        [RC].[NormalizedAvgAssetDwellTime] = t.[NormalizedAvgAssetDwellTime] AND
        [RC].[RatingPresent] = t.[RatingPresent] AND
        [RC].[NormalizedAvgSatDwellTime] = t.[NormalizedAvgSatDwellTime] AND
        [RC].[NormalizedAvgDSatDwellTime] = t.[NormalizedAvgDSatDwellTime] AND
        [RC].[ResultViewCountForSearch] = t.[ResultViewCountForSearch] AND
        [RC].[ResultClickCount] = t.[ResultClickCount] AND
        [RC].[ExitType] = t.[ExitType] AND
        [RC].[ViewSequence] = t.[ViewSequence] AND
        [RC].[QueryCultureName] = t.[QueryCultureName] AND
        [RC].[LastViewOfSearch] = t.[LastViewOfSearch] AND
        [RC].[DifferentCulture] = t.[DifferentCulture] AND
        [RC].[ResultsAfter] = t.[ResultsAfter] AND
        [RC].[SecondsFromSearchStarted] = t.[SecondsFromSearchStarted] AND
        [RC].[QueryLanguageName] = t.[QueryLanguageName] AND
        [RC].[RawDwellTime] = t.[RawDwellTime] AND
        [RC].[DisplaySequence] = t.[DisplaySequence] AND
        [RC].[ExplicitJudgment] = t.[ExplicitJudgment]
```

The user search bundler module 150 is operative to bundle user searches based on common normalized query terms. The user search bundler module 150 is illustrated in FIG. 1 after the relevance classifier module 145, but according to an embodiment, the functionality of the user search bundler 150 certain types of search queries, such as those responsible for the "Reject" classifications. For example, if a search query results in multiple "Reject" classifications, a diagnostic analysis may conclude that a search query of a particular grammatical structure or of a particular language type may result in unsatisfactory search results. In response, a developer of the search mechanism may provide functionality for offering a searching user an alternative search query grammatical structure or language type in response to input of a search query in a grammatical structure or according to a language type that is known to provide unsatisfactory results.

The analysis warehouse 160 is illustrative of a database for storing the analysis results of the system 100. According to an embodiment, the user behavior analyzer 115 may be operative to pack processing results from the system 100 for a given batch of user search behavior data according to a format such as the XML format. The data may then be sent to the analysis warehouse 160 for storage and for subsequent use in improving web asset content and for improving mapping between search query terms and web asset content. In addition, as will be described below, data produced by the user search behavior analysis system 100 and stored in the analysis warehouse 160 may be utilized by other applications that may make use of relevance classifications applied to various search results in association with search queries responsible for obtaining the search results.

Figure 2:
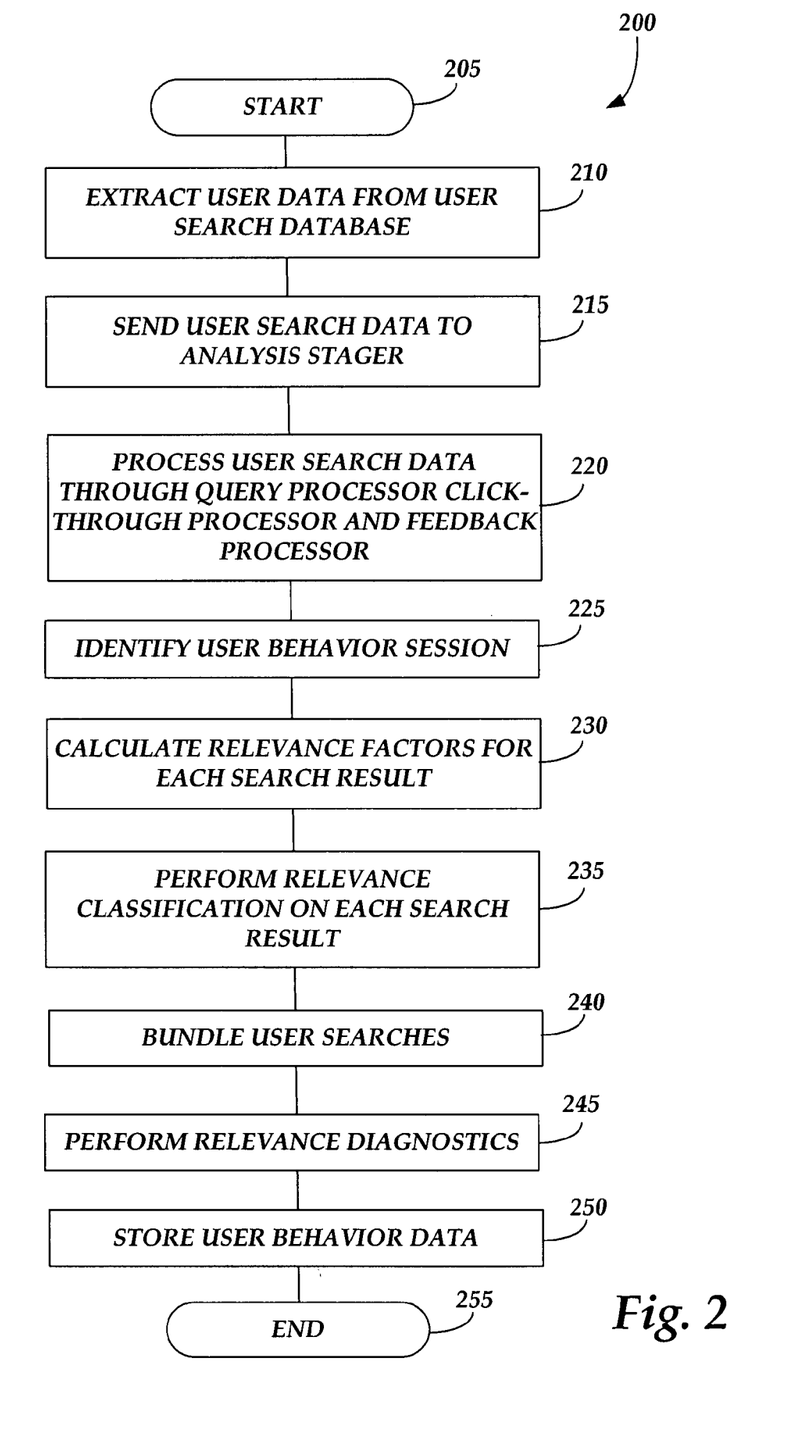
FIG. 2 is a logical flow diagram illustrating a method for analyzing user search behavior.

Having described an architecture for a system for analyzing user search behavior above with reference to FIG. 1, it is advantageous to further describe embodiments of the present invention with respect to an example operation of the user search behavior analysis system 100. FIG. 2 is a logical flow diagram illustrating a method for analyzing user search behavior. For purposes of discussion of the example operation illustrated in FIG. 2 consider, for example, that a user of an Internet browsing application, such as INTERNET EXPLORER® manufactured by MICROSOFT CORPORATION, browses to a number of websites during a searching session searching for information that is relevant to a topic of interest to the searching user. After the user enters a search query directed to the topic of interest, a number of web assets (for example, web pages, websites, and other Internet-based content) are displayed to the user via the user's Internet browsing application.

As the user selects various displayed web assets, data on the user's behavior is stored in the user search database 105, described above. For example, the search queries entered by the user are stored in the database 105. Each search result responsive to the search queries entered by the user is stored in the database 105. Each search result selected for viewing by the user is stored in the database 105. When the user selects a particular web asset, a start time of the user's viewing of the selected asset is stored and when the user exits viewing of the selected web asset, an end time for the user's viewing is stored. The behavior of the user while viewing the selected web asset is also stored. For example, if the user is asked to provide explicit feedback on a particular web asset, and the user responds to the feedback request, any explicit feedback provided by the user will be stored at the database 105. That is, any behavior of the user during the searching session applicable to the relevance factors described above will be stored for the user's searching behavior in the database 105.

The Method 200, illustrated in FIG. 2, begins at start operation 205 and proceeds to operation 210 where the user search behavior analysis system 100 extracts user search data from the user search database 105 for running an analysis on the search behavior of the user during the user's search operation. The method then proceeds to operation 215 where the user search data extracted from the database 105 is sent to the user behavior analyzer 115, as described above with reference to FIG. 1. At operation 220, the user behavior analyzer 115 sends data extracted from the database 105 to each of the query processor module 120, the click-through processor module 125 and the feedback processor module 130. As described above with reference to FIG. 1, each of these modules reads data extracted from the database 105 applicable to search queries entered, user behavior after click-through to a particular web asset, and explicit user feedback, respectively.

At operation 225, the user behavior analyzer supplies the session identification module 135 with data associated with the start-times and end-times associated with various search queries. In response, based on the time gap between consecutive search queries entered by the searching user, the session identification module 135 establishes searching sessions and groups various consecutive search operations into identified search sessions so that the system 100 may analyze user search behavior for those search queries run and behavior exhibited by the searching user during identified sessions.

At operation 230, the user behavior analyzer 115 supplies data read from each of the processors 120, 125, 130 for a given session identified by the session identifier module 135 to the relevance calculation processor 140. As described above, the relevance calculation processor calculates a number of relevance factors from the user behavior data extracted from the database 105 and processed by each of the processor modules 120, 125, 130.

At operation 235, the relevance factors calculated by the relevance calculation processor module are passed to the relevance classifier module 145 for calculating a relevance judgment and confidence level for each search result grouped into a given search session. As described above, according to one embodiment, operation 235 is performed by passing the relevance factors to a SQL Decision Tree Data Mining Model that may be used for classifying each of the search results as one of three relevance judgments, including "Accept," "Reject," or "Explore." In addition, for each relevance judgment, a confidence level may be established by the relevance classifier module for indicating the confidence with which the relevance judgment is assigned to a particular search result based on the relevance factors calculated for the search result. As described above, for any search result for which the searching user provided explicit feedback, a confidence level of 1.0 may be assigned to the relevance judgment.

At operation 240, user search data is bundled based on common normalized query terms. As described above, operation of the user search bundler may occur at other times in the process illustrated in FIG. 2. For example, operation 240 may be performed prior to operation 225, and the results of operation 240 may be used to assist in the process of grouping search behavior into sessions.

As described above, after the relevance of various search results has been classified by the relevance classifier module 145, the classifications may be utilized for a number of purposes. For example, at operation 245, relevance diagnostics may be performed based on the relevance classifications assigned to search results by the system 100. As described above, relevance diagnostics may include modification of the programming of a given search mechanism for how the search mechanism processes search queries for returning relevant search results. In addition, relevance diagnostics may include passing information prepared by the system 100 to other applications that may be operative to utilize relevance classification data for providing additional search functionality and assistance. At operation 250, the user behavior analysis data is stored at the analysis warehouse 160 for subsequent use. The method ends at operation 255.

Operating Environment

Figure 3:
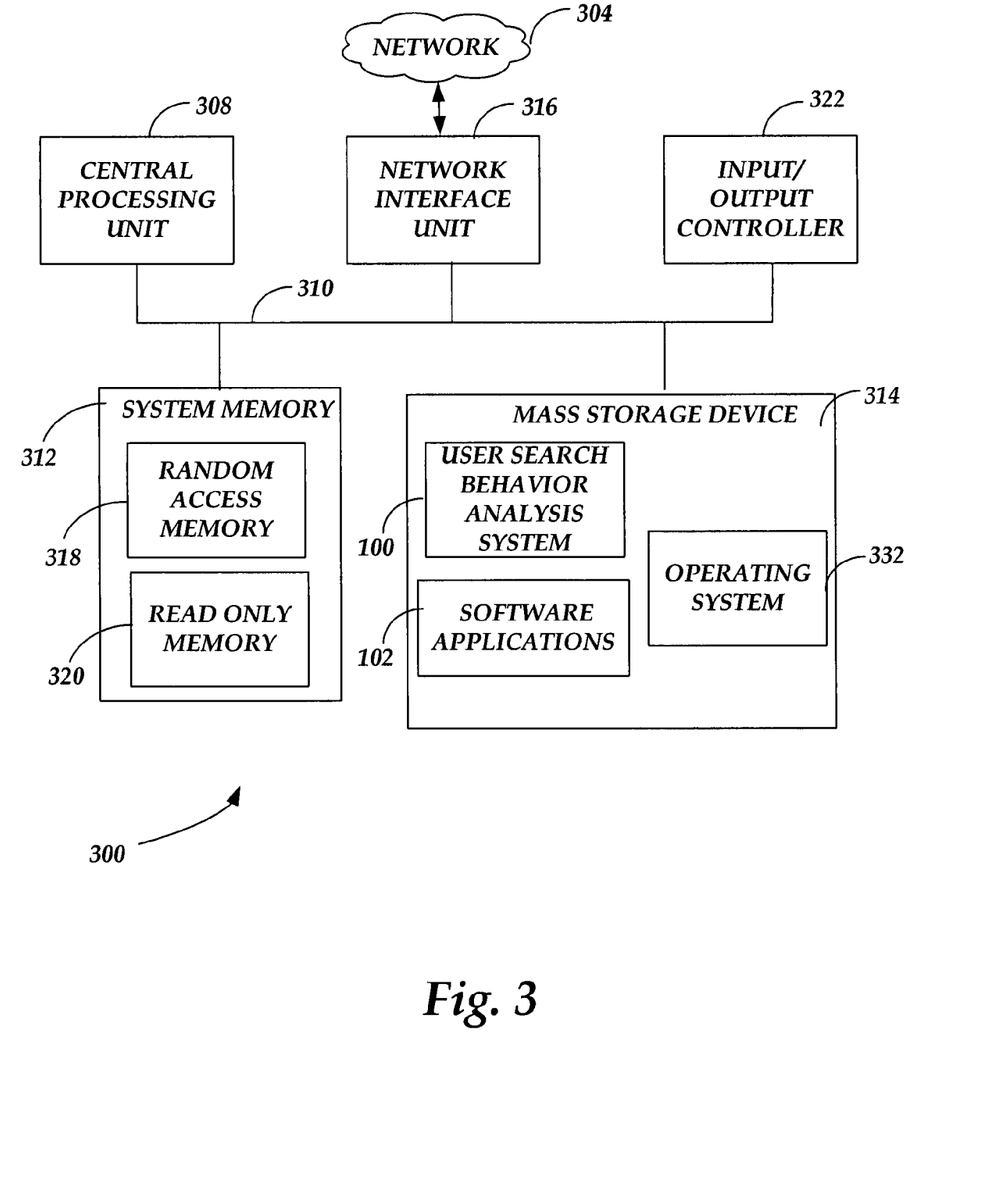
FIG. 3 is a simplified block diagram illustrating an example computing operating environment in which embodiments of the invention may be practiced.

Referring now to FIG. 3, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 3, an illustrative operating environment for embodiments of the invention will be described. As shown in FIG. 3, computer 300 comprises a general purpose desktop, laptop, handheld, mobile or other type of computer (computing device) capable of executing one or more application programs. The computer 300 includes at least one central processing unit 308 ("CPU"), a system memory 312, including a random access memory 318 ("RAM") and a read-only memory ("ROM") 320, and a system bus 310 that couples the memory to the CPU 308. A basic input/output system containing the basic routines that help to transfer information between elements within the computer, such as during startup, is stored in the ROM 320. The computer 302 further includes a mass storage device 314 for storing an operating system 332, application programs, and other program modules.

The mass storage device 314 is connected to the CPU 308 through a mass storage controller (not shown) connected to the bus 310. The mass storage device 314 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available media that can be accessed or utilized by the computer 300.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 300.

According to various embodiments of the invention, the computer 300 may operate in a networked environment using logical connections to remote computers through a network 304, such as a local network, the Internet, etc. for example. The computer 302 may connect to the network 304 through a network interface unit 316 connected to the bus 310. It should be appreciated that the network interface unit 316 may also be utilized to connect to other types of networks and remote computing systems. The computer 300 may also include an input/output controller 322 for receiving and processing input from a number of other devices, including a keyboard, mouse, etc. (not shown). Similarly, an input/output controller 322 may provide output to a display screen, a printer, or other type of output device.

As mentioned briefly above, a number of program modules and data files may be stored in the mass storage device 314 and RAM 318 of the computer 300, including an operating system 332 suitable for controlling the operation of a networked personal computer, such as the WINDOWS® operating systems from MICROSOFT CORPORATION of Redmond, Wash. The mass storage device 314 and RAM 318 may also store one or more program modules. In particular, the mass storage device 314 and the RAM 318 may store application programs, such as a software application, for example, a word processing application, a spreadsheet application, a slide presentation application, a database application, etc.

According to embodiments of the present invention, a user search behavior analysis system 100 is illustrated for analyzing user search behavior as described herein. Other client applications 102 may include an Internet browsing application, as described above, or other types of software applications, such as word processing applications, slide presentation applications, spreadsheet applications, desktop publishing applications, etc.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various embodiments, those of ordinary skill in the art will understand that many modifications may be made thereto within the scope of the claims that follow. Accordingly, it is not intended that the scope of the invention in any way be limited by the above description, but instead be determined entirely by reference to the claims that follow.

We claim:

1. A method of analyzing search behavior, the method comprising:

storing, by one or more computers, data associated with searches and user behavior with regard to a plurality of search results produced by the searches;

identifying, by the one or more computers, a session comprising one or more related search results in the plurality of search results;

prior to calculating one or more relevance factors:

processing, by the one or more computers, the data to determine search queries that were used to locate each search result in the session;

processing, by the one or more computers, the data to determine click-through behavior for each search result in the session; and processing, by the one or more computers, the data to obtain explicit feedback on search results in the session;

calculating, by the one or more computers, the one or more relevance factors for each search result in the session, wherein a relevance factor for a search result is data that describes an aspect of user behavior regarding the search result, and wherein calculating the one or more relevance factors comprises:

calculating, by the one or more computers, the one or more relevance factors using the search queries that were used to locate each search result in the session;

calculating, by the one or more computers, the one or more relevance factors using the click-through behavior for each search result in the session; and calculating, by the one or more computers, the one or more relevance factors using the explicit feedback on each search results in the plurality of search results;

determining a first user behavior profile based on one or more relevance factors for search results in the plurality of search results having explicit feedback indicating that the search results are acceptable;

determining a second user behavior profile based on one or more relevance factors for search results in the plurality of search results having explicit feedback indicating that the search results are not acceptable; and assigning a relevance classification of acceptable to a given search result in the session when the relevance factors for the given search result are similar to the relevance factors for the first user behavior profile, wherein no explicit feedback is provided for the given search result;

assigning, by the one or more computers, a relevance classification of unacceptable to the given search result when the relevance factors for the given search result are similar to the relevance factors for the second user behavior profile.

2. The method of claim 1, wherein identifying the session includes: identifying, by the one or more computers, one or more search results in the plurality of search results obtained in a prescribed time period.

3. The method of claim 1, further comprising:
determining, by the one or more computers, a third user behavior profile based on one or more relevance factors associated with the search results for which explicit feedback is provided and for which the search results are partially acceptable to the searching user.

4. The method of claim 3, further comprising: assigning a relevance classification of partially acceptable to the given search result when the relevance factors for the given search result are similar to the relevance factors on which the third user behavior profile is based.

5. The method of claim 1, further comprising:
storing, by the one or more computers, the relevance classification for the given search result; and
performing relevance diagnostics based on the relevance classification assigned to the given search result.

6. A computer system that analyzes search behavior, the computer system comprising:
at least one processing unit; and
one or more memory storage devices storing:
a user search database operative to store data associated with searches and user behavior with regard to a plurality of search results produced by the searches;
a session identifier module that, when executed by the processing unit, is operative to identify a session comprising one or more related search results in the plurality of search results, the related search results produced by a plurality of searches initiated by a user;
a relevance calculation module that, when executed by the processing unit, is operative to:
prior to calculating one or more relevance factors:
process the data to determine search queries that were used to locate each search result in the session;
process the data to determine click-through behavior for each search result in the session; and
process the data to obtain explicit feedback on search results in the session;
calculate the one or more relevance factors for each search result in the session, wherein each of the relevance factors for each of the search results in the session is data that describes an aspect of the user's behavior with regard to the search result, and wherein the one or more relevant factors are calculated using the search queries that were used to locate each search result in the session, the click-through behavior for each search result in the session, and the explicit feedback on each search results in the plurality of search results;
determine a first user behavior profile based on one or more relevance factors for search results in the plurality of search results having the explicit feedback indicating that the search results are acceptable;
determine a second user behavior profile based on one or more relevance factors for search results in the plurality of search results having the explicit feedback indicating that the search results are not acceptable, the search queries that were used to locate each search result in the session, and the click-through behavior for each search result in the session; and
a relevance classifier module that, when executed by the processing unit, is operative to:
assign a relevance classification of acceptable to each clicked-through search result in the session for which no explicit feedback is provided and for which the relevance factors for the clicked-through search result are similar to the relevance factors for the first user behavior profile;
assign a relevance classification of unacceptable to each clicked-through search result for which no explicit feedback is provided and for which the relevance factors for the clicked-through search result are similar to the relevance factors for the second user behavior profile.

7. The computer system of claim 6, wherein the session identifier module, when executed by the processing unit, is further operative to identify the session by identifying one or more search results in the plurality of search results obtained in a prescribed time period.

8. The computer system of claim 6,
wherein the relevance classifier module, when executed by the processing unit, is further operative to determine a third user behavior profile based on one or more relevance factors for search results for which explicit feedback is provided and for which the search result is partially acceptable to a searching user; and
wherein the relevance classifier module, when executed by the processing unit, assigns a relevance classification of partially acceptable to each clicked-through search result in the session for which no explicit feedback is provided and for which the relevance factors for clicked-through search result are similar to the relevance factors for the third user behavior profile.

9. A computer readable storage medium containing computer executable instructions which when executed cause a computer to:
identify a session comprising one or more related search results in a plurality of search results, each search result in the session obtained by a search mechanism from a single user within in a prescribed time period;
prior to calculating one or more relevance factors:
process the data to determine search queries that were used to locate each search result in the session;
process the data to determine click-through behavior for each search result in the session; and
process the data to obtain explicit feedback on search results in the session;
calculate one or more relevance factors for clicked-through search results in the session, wherein for each of the clicked-through search results in the session, each of the relevance factors for the clicked-through search result is data that describes an aspect of the user's behavior regarding the clicked-through search result, and wherein the one or more relevance factors are further calculated by using the search queries that were used to locate each search result in the session, the click-through behavior for each search result in the session, and the explicit feedback on each search result in the plurality of search results;
train a SQL decision tree data mining model to:
associate a first user behavior profile with one or more relevance factors associated with search results in the plurality of search results for which explicit feedback is provided and for which the search results are acceptable to a searching user;
associate a second user behavior profile with one or more relevance factors associated with search results for which explicit feedback is provided and for which the search results are not acceptable to the searching user; and
associate a third user behavior profile with one or more relevance factors associated with search results for which explicit feedback is provided and for which the search results are partially acceptable to the searching user;
for each clicked-through search result in the session for which no explicit feedback is provided:
send a Data Mining Extensions (DMX) query to the SQL decision tree data mining model, the DMX query including the relevance factors for the clicked-through search result;
receive, from the SQL decision tree data mining model in response to the DMX query, a relevance classification of acceptable for the clicked-through search result when the relevance factors for the clicked-through search result are similar to the relevance factors associated with the first user behavior profile;
receive, from the SQL decision tree data mining model in response to the DMX query, a relevance classification of unacceptable for the clicked-through search result when the relevance factors for the clicked-through search result are similar to the relevance factors associated with the second user behavior profile;
receive, from the SQL decision tree data mining model in response to the DMX query, a relevance classification of partially acceptable for the clicked-through search result when the relevance factors for the clicked-through search result are similar to the relevance factors associated with the third user behavior profile; and
calculate a confidence level for the clicked-through search result, the confidence level for the clicked-through search result indicating a confidence with which the relevance classification for the clicked-through search result is assigned to the search result;
wherein the relevance classifications assigned to the clicked-through search results in the session are further based on relevance of each of the search results in the session to search queries that were used to locate each of the search results in the session.

* * * * *